Sept. 13, 1949.  J. W. WHEELER ET AL  2,481,635
AIRCRAFT UNDERCARRIAGE
Filed Jan. 25, 1947  3 Sheets-Sheet 1
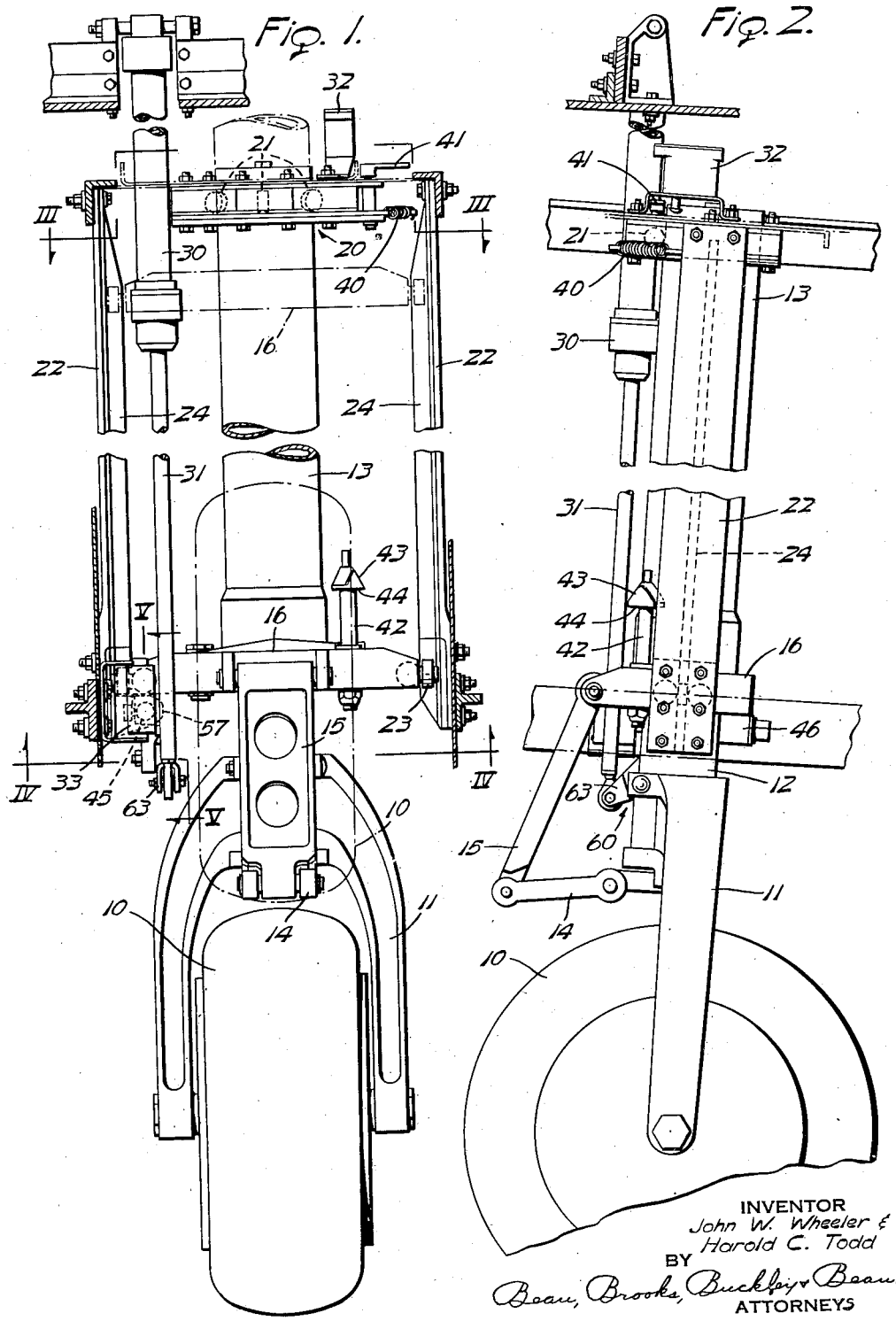
INVENTOR
John W. Wheeler &
Harold C. Todd
BY
Bean, Brooks, Buckley & Bean
ATTORNEYS Sept. 13, 1949.  J. W. WHEELER ET AL  2,481,635
AIRCRAFT UNDERCARRIAGE Filed Jan. 25, 1947   3 Sheets-Sheet 2

INVENTOR
John W. Wheeler &
Harold C. Todd
BY
Bean, Brooks, Buckley & Bean.
ATTORNEYS

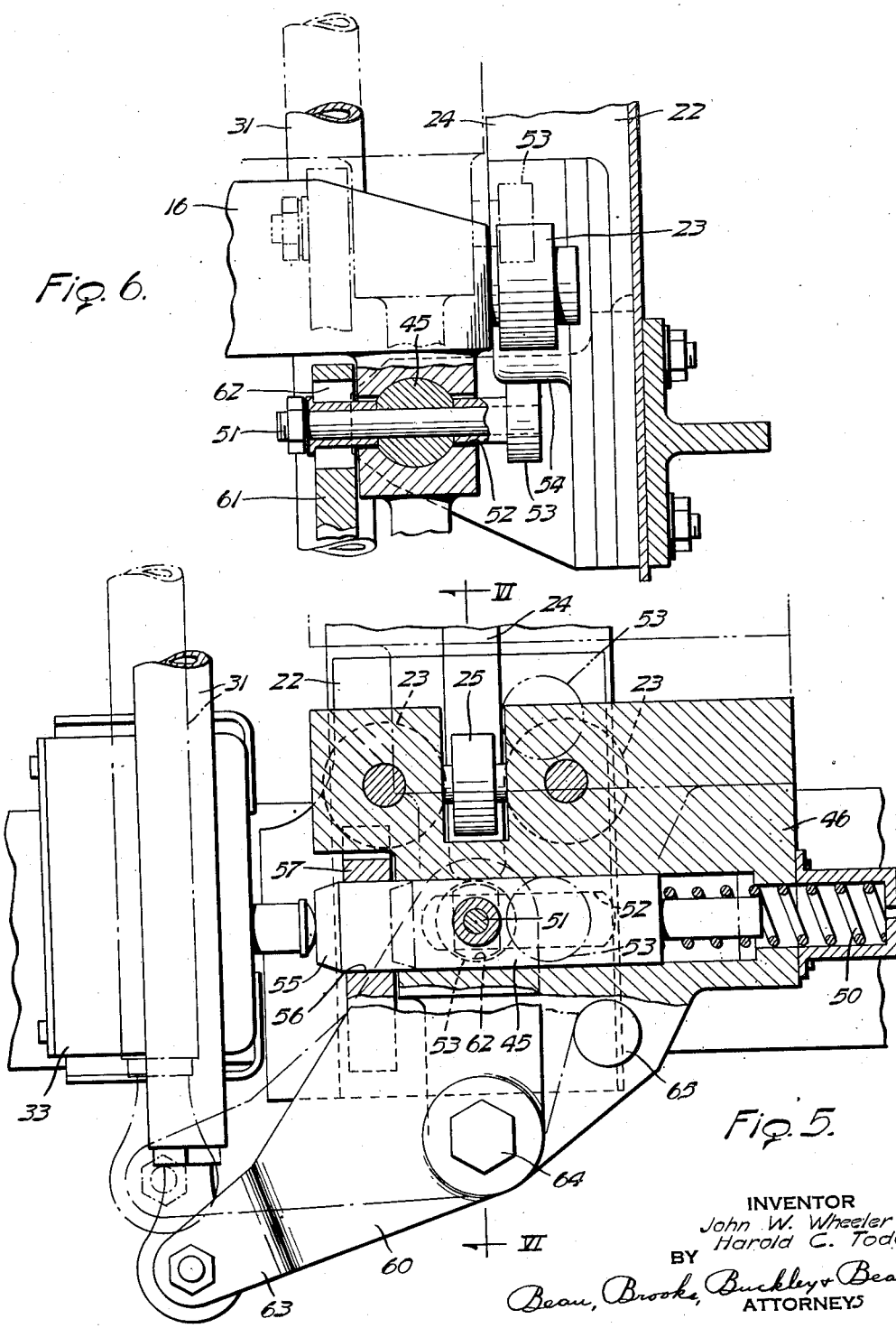

Patented Sept. 13, 1949

2,481,635

UNITED STATES PATENT OFFICE 2,481,635

AIRCRAFT UNDERCARRIAGE

John W. Wheeler, Grand Island, and Harold C. Todd, Kenmore, N. Y., assignors to Bell Aircraft Corporation, Buffalo, N. Y.

Application January 25, 1947, Serial No. 724,364

11 Claims. (Cl. 244—102)

Our invention relates to landing gear arrangements in aircraft and the like, and more particularly to a vertically retractable type gear for use, for example, in connection with the nose wheel of a tricycle type airplane undercarriage.

The principal object of our invention is to provide a landing gear which is simple and sturdy in design, and one which may be easily and efficiently operated.

Another object is to provide a landing gear so compact as to occupy a minimum amount of space in the airplane.

A further object is to provide means for locking the landing gear in its extended and retracted positions.

The above objects and advantages, as well as others which will be apparent to those skilled in the art, have been accomplished by the device shown in the accompanying drawings, of which:

Fig. 1 is a front elevation of our invention;

Fig. 2 is a side elevation of the same;

Fig. 5 is an enlarged fragmentary sectional view of the down-position locking means taken on line V—V of Fig. 1; and Fig. 6 is an enlarged fragmentary sectional view taken on line VI—VI of Fig. 5.

Figure 4:
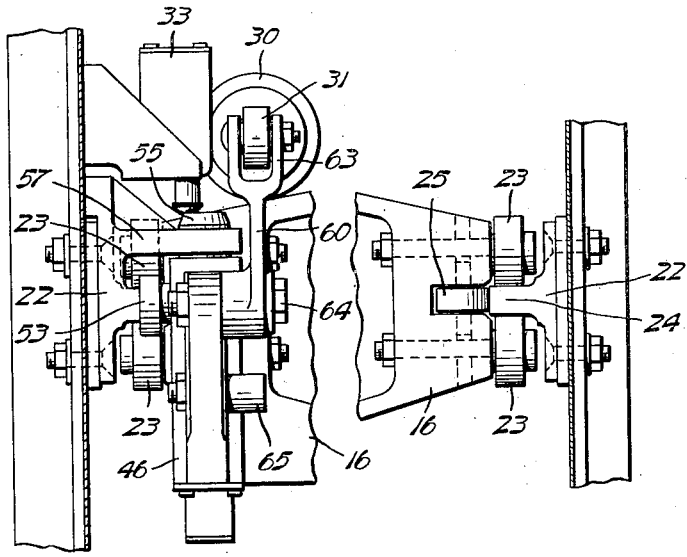
Fig. 4 is a bottom plan view showing the strut guideways and the down-position locking means.

As shown in Figs. 1 and 2, 10 represents the nose wheel or other landing support of an airplane which is rotatably mounted in customary manner by means of the wheel fork 11. This fork is provided at its upper end with a piston member 12 which is longitudinally movable with relation to the strut 13 of our device, for customary shock absorbing purposes. The wheel fork, as is customary, is maintained in non-rotative manner while permitting some relative axial movement with the strut 13 by means of a toggle arm 14 and a connected toggle link 15. The link has its free end connected to the wheel fork, and the free end of the arm is connected to a strut yoke 16. The strut 13 of our device is of elongated cylindrical form and the yoke 16 is carried at the lower end thereof. The strut is vertically arranged and is supported at its upper end by a bearing block 20. This bearing block is provided with a plurality of bearing rollers 21 which are preferably equidistantly spaced about the strut for vertical guidance thereof.

Figure 3:
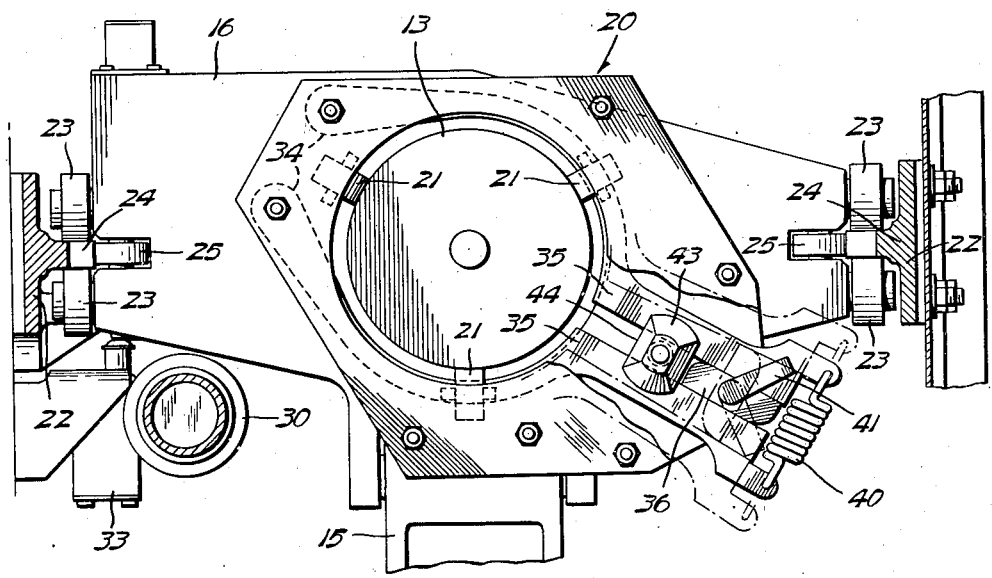
Fig. 3 is a top plan sectional view showing details of the up-position locking means taken on line III—III of Fig. 1.

Arranged at each side of the strut member and in spaced relation therewith is a track 22. These tracks are preferably of T-shaped cross sections, as shown in Figs. 1 and 3, and are suitably secured to the airplane structure. The yoke 16 is extended outwardly toward each of the tracks and is provided at its extreme ends with oppositely arranged bearing rollers 23 for antifriction engagement with the sides of the leg 24 of the track. A centrally arranged bearing roller 25 is also carried at each end of the yoke for engagement with the inner face of the leg 24 of the track, whereby lateral movement of the yoke is prevented.

The strut 13 together with the attached wheel is reciprocated by means of a hydraulic cylinder 30 suitably supported by the structure of the airplane and formed with a reciprocating piston rod 31. This piston rod extends downwardly and its lower end is pivotally connected to the yoke 16 in a manner to be hereinafter described. Suitable connections (not shown) are provided for supplying fluid under pressure to the cylinder for actuating the piston rod 31 thereof. The control of the flow of fluid to the cylinder is of course accomplished by any suitable manual means forming no part of our invention and therefore not shown or described. An up-position limit switch 32 is carried by the bearing block 20, and a down-position switch 33 is carried by a stationary part of the device or the airplane structure. These switches are contacted by suitable members carried by the strut whereby indications may be given when the strut member has reached its extreme up or down positions.

Means are provided for locking the strut in its retracted and extended positions. The up-position or retracted locking means comprises two oppositely arranged locking jaws 34 pivotally mounted at their extreme ends upon the bearing block 20. The central portion of these jaws is preferably curved as shown in Fig. 3 so as to straddle the strut member 13 which passes therebetween. Arms 35 are formed at the free ends of these jaws which are preferably in parallel spaced relation, and a release cam 36 is disposed between them. The arms are held against the release cam by means of an attached helical spring 40. The cam 36 is elongated in one dimension so that when rotated it will cause the arms 35 of the jaws to be spread apart. A release arm 41 is carried by the cam, whereby the arms 35 of the jaws may be separated at will. Carried by the yoke 16 is a locking member 42 having a spear point 43 at its extreme upper end. The spear point is formed with a downwardly facing shoulder 44 for engagement with the upper surface of the arms 35. This spear point is designed to engage the inner edge surfaces of the arms 35 when the strut 13 is approaching the end of its upward movement and to spread the arms as the spear point passes therebetween, after which they will be permitted to assume their normal closed positions under the tension of the spring 40. In this position the shoulder 44 of the locking member will engage the top surfaces of the arms and thereby lock the strut in its up position. It is at this point that the locking member 42 engages the moving element of the up-position limit switch 32 to indicate by any suitable means (not shown) that the strut has reached its upper position. When it is desired to release the strut in order that the wheel may be brought into operative position, it is only necessary to actuate the release cam by means of its release arm 41 which will cause the arms 35 to be separated sufficiently to release the shoulder 44 of the locking member 42 which will then permit the assembly to be extended to its operative position.

Locking means are also provided for the down position of the strut member. These down-position locking means, which are shown in detail in Figs. 4, 5 and 6, comprise a plunger 45 mounted for reciprocation within a housing 46 carried by the yoke 16 and pressed outwardly toward operative position by means of a spring 50 also carried by the housing. The plunger carries a laterally arranged shaft 51 which passes through a slot 52 formed in the housing 46 and has its ends extending from both sides of the housing. A guide roller 53 is rotatably mounted upon one of the projecting ends of the shaft. When the plunger is extended as shown in Fig. 5 the forward end 55 thereof engages an aperture 56 formed in a stationary lug 57 carried by the adjacent track 22 for locking the landing gear in down position in which position the roller 53 has been moved underneath the lower end of the leg 24 of the adjacent track. The opposite end of the shaft 51 is actuated by a bell crank lever 60, pivotally carried by the yoke and having an upwardly projecting arm 61 formed with a slot 62 for engagement with the opposite projecting end of the shaft. The lever is also provided with an outwardly extending arm 63 to which the lower end of the piston rod 31 is pivotally connected. The lever arm is pivoted to the yoke 16 at 64 and is limited in its clockwise movement by means of a lock stud 65. The stationarily arranged down switch 33 is engaged by the end 55 of the plunger when in its locking position.

In Fig. 5, we have shown the down-position lock in engagement. As here shown the guide roller 53 has been moved downwardly to a position where it has been disengaged from the guiding surface of the track leg 24, and to a position of locking engagement with the lower end 54 thereof. The end 55 of the plunger 45 is also lockingly engaged with the aperture 56 of the stationary lug 57. When it is desired to raise the wheel, the initial movement of piston rod 31 will cause the bell crank lever 60 to be rotated up to its pivot 64. This initial movement retracts the locking plunger 45 releasing its end 55 from engagement with the lug 57, thereby unlocking the plunger, and at the same time such initial movement will cause the guide roller 53 to be moved out from under the bottom end of the track. The lever will during this initial movement be brought into engagement with the stop lug 65, and continued movement of the piston rod 31 after such engagement will serve to elevate the strut. The guide roller 53 will thereupon run against the track as the strut moves upwardly. When the roller is so engaged with the track, the lever 60 will be kept in such position as to retain the plunger in its retracted position.

When the strut is moved to its upper predetermined position, the spear point 43 of the lock member 42 will have passed between the arms 35 of the locking jaws thereby locking the strut in its upper position, as hereinbefore described. When the up-position lock is released, the strut will be free to move downwardly. During such movement the bell crank lever 60 will be prevented from rotating on its pivot 64 by means of the guide roller 53, because of its engagement with the side surface of the adjacent track. When, however, the roller runs off the lower end of the track, the plunger 45 is in registration with the locking aperture 56. The spring 50 is then released to drive the plunger 45 into its locking position, as illustrated in Fig. 5.

What is claimed is:

1. A retractable landing gear, comprising a landing support, a vertically arranged strut member carrying said support and adapted to be reciprocated longitudinally to its extreme up and down positions, a yoke secured to the lower end of said strut member, spaced tracks for guiding said member during its movements, and a down-position lock carried by said yoke and movable underneath and engageable with the lower end of one of said tracks when said member is in its lower position.

2. A retractable landing gear, comprising an elongated reciprocating strut, a landing support at the lower end of said strut, means for guiding said strut in its reciprocating movements, hydraulic actuating means for reciprocating said strut, a piston rod connecting said hydraulic actuating means with said strut, up-position locking means actuated to locking position by the upward movement of said strut, and down-position locking means carried by said yoke and connected with said rod, said locking means being actuated by relative movement between said rods and said strut.

3. A retractable landing gear, comprising an elongated reciprocating strut, a landing support at the lower end of said strut, means for guiding said strut in its reciprocating movements, hydraulic actuating means for reciprocating said strut, a piston rod connecting said hydraulic actuating means with said strut, up-position locking means at the upper end of said guiding means and actuated to latching engagement therewith by the upward movement of said strut, cam means for unlatching said up-position locking means, and down-position locking means carried by said yoke actuated by said piston rod subsequently to the movement of said strut to its lower position.

4. A retractable landing gear, comprising an elongated reciprocating strut, a landing support at the lower end of said strut, means for guiding said strut in its reciprocating movements, actuating means for reciprocating said strut, a piston rod carried by said actuating means and having relative movement with said strut at the extreme strut positions, up-position locking means actuated by upward movement of said strut, and down-position locking means comprising a movable lock member engageable with the stationary parts of the guiding means and moved to its operative and inoperative positions by means of relative movement between said strut and said actuating means.

5. A retractable landing gear, comprising an elongated reciprocating strut, a landing support at the lower end of said strut, means for guiding said strut in its reciprocating movements, actuating means for reciprocating said strut, and up-position locking means actuated by upward movement of said strut, said locking means including pivotally mounted lock jaws having their free ends spring pressed toward each other, and a locking stud having a pointed upper end and a downwardly facing shoulder, said stud being carried by said strut and engageable with said jaws to separate them and to become lockingly engaged therewith.

6. A retractable landing gear, comprising an elongated reciprocating strut, a landing support at the lower end of said strut, means for guiding said strut in its reciprocating movements, actuating means for reciprocating said strut, up-position locking means actuated by upward movement of said strut, said locking means including pivotally mounted lock jaws having their free ends spring pressed toward each other, and a locking stud having a pointed upper end and a downwardly facing shoulder, said stud being carried by said strut and engageable with said jaws to separate them and to become lockingly engaged therewith, and cam means for separating said jaws to release said locking stud.

7. A retractable landing gear, comprising an elongated reciprocating strut, a landing support at the lower end of said strut, oppositely arranged T-shaped tracks spaced from said strut, a strut yoke carrying the lower end of said strut and guided in its reciprocating movement by said tracks, reciprocating means for actuating said yoke and said strut, down-position locking means carried by said yoke and engageable with the lower end of one of said tracks to lock said strut in its lower position, said reciprocating means having initial limited relative movement with said strut at the beginning of its up stroke and at the beginning of its down stroke to cause the down-position locking means to be actuated to its locked and unlocked positions independently of the movement of said strut.

8. A retractable landing gear, comprising an elongated reciprocating strut, a landing support at the lower end of said strut, oppositely arranged T-shaped tracks spaced from said strut, a strut yoke carrying the lower end of said strut and guided in its reciprocating movement by said tracks, reciprocating means for actuating said yoke and said strut, a guide roller engageable with the side of said track during movement of said strut and arranged to roll off the lower end of said track when said strut is in its lower position.

9. A retractable landing gear, comprising an elongated reciprocating strut, a landing support at the lower end of said strut, oppositely arranged T-shaped tracks spaced from said strut, a strut yoke carrying the lower end of said strut and guided in its reciprocating movement by said tracks, reciprocating means for actuating said yoke and said strut, a stationary lock lug, a plunger engageable with said lug when said strut is in its lower position, means operated by said actuating means to move said plunger to its locked and unlocked positions independently of the movement of said strut, and means carried by said plunger to maintain it in its unlocked position during the movement of said strut.

10. A retractable landing gear, comprising an elongated reciprocating strut, a landing support at the lower end of said strut, oppositely arranged T-shaped tracks spaced from said strut, a strut yoke carrying the lower end of said strut and guided in its reciprocating movement by said tracks, reciprocating means for actuating said yoke and said strut, a stationary lock lug, a plunger engageable with said lug when said strut is in its lower position, means operated by said actuating means to move said plunger to its locked and unlocked positions independently of the movement of said strut, and roller means carried by said plunger and movable under the end of one of said tracks when said plunger is in its locking position, said roller serving to prevent such engagement during the movement of said strut.

11. A retractable landing gear, comprising an elongated reciprocating strut, a landing support at the lower end of said strut, oppositely arranged T-shaped tracks spaced from said strut, a strut yoke carrying the lower end of said strut and guided in its reciprocating movement by said tracks, reciprocating means for actuating said yoke and said strut, a stationary lock lug, a plunger engageable with said lug when said strut is in its lower position, means operated by said actuating means to move said plunger to its locked and unlocked positions independently of the movement of said strut, and roller means carried by said plunger and engageable with the adjacent track during the movement of said strut, said roller being movable under the lower end of the engaged track when said strut has reached its down position, whereby the plunger may engage said lock lug.

JOHN W. WHEELER.
HAROLD C. TODD.

REFERENCES CITED

The following references are of record in the file of this patent:

UNITED STATES PATENTS

| Number | Name | Date |
| --- | --- | --- |
| 1,780,811 | Burnelli | Nov. 4, 1930 |
| 1,842,776 | Bogoslowsky | Jan. 26, 1932 |
| 2,110,865 | Burgess | Mar. 15, 1938 |
| 2,351,284 | Overbeke | June 13, 1944 |

FOREIGN PATENTS

| Number | Country | Date |
| --- | --- | --- |
| 548,916 | Great Britain | Oct. 29, 1942 |
| 578,364 | Germany | June 12, 1933 |